(12) United States Patent
Shimomura

(10) Patent No.: US 6,468,161 B1
(45) Date of Patent: Oct. 22, 2002

(54) VIDEO GAME DEVICE AND METHOD OF DISPLAYING IMAGES OF GAME, AND STORAGE MEDIUM STORING PROGRAMS FOR CAUSING A COMPUTER TO EXECUTE THE METHOD

(75) Inventor: Satoshi Shimomura, Tokyo (JP)

(73) Assignee: Konami Co., Ltd., Hyogo (JP)

( * ) Notice: Subject to any disclaimer, the term of this patent is extended or adjusted under 35 U.S.C. 154(b) by 0 days.

(21) Appl. No.: 09/414,523

(22) Filed: Oct. 8, 1999

(30) Foreign Application Priority Data

Oct. 8, 1998 (JP) ............................................ 10-287131

(51) Int. Cl.[7] .................................................. A63F 9/24
(52) U.S. Cl. ................................ 463/43; 463/31; 711/1
(58) Field of Search ................................. 463/1, 30–34, 463/43–44; 711/1, 100, 170, 173, 147, 148, 153

(56) References Cited

U.S. PATENT DOCUMENTS 5,634,850 A * 6/1997 Kitahara et al.
5,830,065 A * 11/1998 Sitrick

FOREIGN PATENT DOCUMENTS

JP          8-235366          9/1996

\* cited by examiner

Primary Examiner—Mark Sager
(74) Attorney, Agent, or Firm—Sughrue Mion, PLLC

(57) ABSTRACT

The video game device which may display 2D images and pseudo 3D images without need to rewrite data in a frame buffer for a long time in a game. The frame buffer includes a display area storing images directly transferred to the monitor and a non-display area storing images used to produce the image transferred to the monitor. Only the changing parts of the images continuously displayed on the monitor are stored as small sized area in the non-display area and only the changing parts are put on the image to be displayed at a desired timing.

7 Claims, 9 Drawing Sheets

VIDEO GAME DEVICE AND METHOD OF DISPLAYING IMAGES OF GAME, AND STORAGE MEDIUM STORING PROGRAMS FOR CAUSING A COMPUTER TO EXECUTE THE METHOD

BACKGROUND OF THE INVENTION

1. Field of the Invention

The invention relates to a video game apparatus and method for displaying images of game, and storage medium storing programs for causing a computer to execute the method, in particular, to a method of displaying the images using a buffer effectively.

2. Description of the Related Art

In recent years, the video games have widely spread to families. Furthermore, the kinds of the games are put on a wide range of types including role playing game, simulation game, fighting game, puzzle game and so on.

Also, there are a wide variety of types of video game apparatuses which are used to play the video games. The video game apparatus may be home-use video game apparatus including a television monitor, or a personal computer/workstation including CRT display device, and the images of games are displayed in the television monitor or the CRT display device. Further, the video game apparatus may also be an arcade video game apparatus which is located at, for example, a game center and which has a body incorporated with a display device.

In the previous video game apparatuses, some display a series of animated images by changing 2D images one after another, and others by using 3D images, which represent images of the video game in perspective and changes the images according to movement of a viewpoint of a player/an object character of the video game (namely, pseudo 3D images). Further, some of these video game apparatuses have the both displaying methods.

The method of displaying the pseudo 3D images brings the video game dynamical effect and the feeling of being at a live performance by representing objects (characters/bodies) in three dimensional style.

Indeed, the method displays the pseudo 3D images by displaying and combining a plurality of polygons models. The surface of each polygon is filled with a pattern and/or shade and then the feel of a material is represented. The pattern and shade may be painted on the polygon by putting a predetermined texture which is a 2D image on the surface of the polygon (namely, texture mapping) or by shading the surface of the polygon based on a pseudo light source which is located in a pseudo 3D space.

Most of the video game apparatuses include a frame buffer which can achieve high speed transmitting of data between the video game apparatus and display device connected to the video game apparatus. Therefore, to display images of games on the display device, the video game apparatus firstly produces data of the image in an area in the frame buffer and secondly transfers the data of the image to the display device.

A first problem is that there is no previous video game apparatus which can display both the 2D image and the pseudo 3D image on the display device. Using only the 2D image, it is not possible to achieve three dimensional effect such as depth (perspective) and movement of a view point. On the other hand, using only pseudo 3D image, it is not possible to represent an expression of a people (an object character of a game) in detail. Therefore, to display both the 2D image and the pseudo 3D image is extremely advantageous in that the both of the images complement each other. The main reason why the representation is not achieved in detail in using the pseudo 3D image is that the previous video game apparatus does not have enough power to process polygon images of high-resolution in real-time.

Herein, an image displayed by the 2D image and the pseudo 3D image is, for example, an image including a close-up image of the upper part of two people and a background image of perspectively represented street. The background image is changed according to a viewpoint of a player/an object character of a game.

Also, in addition to the image data which are supplied to the display device in original aspect, a series of animation images (2D image) or textures (pseudo 3D image), which are used to produce images, may be stored in the frame buffer. In general, the animation images are a series of images which can represent a moving character, but herein, the animation images are also a series of images which can represent changes of display location of the character.

The video game apparatus produces and stores into the frame buffer a plurality of images which are supplied according to transition of story of the video game in order.

In such a case, the storing of the images to the frame buffer is carried out because it is not possible to prepare whole the images before the images are required if data which are used to produce the images are read from a medium of low access speed, such as an external storage device. That is, it is not possible to produce the image at 10 to 60 frames per second, when the required data are read from the external storage device.

When the images are displayed using the method which the images are previously stored in the frame buffer, to display both the 2D image and the pseudo 3D image simultaneously, it is required that both data including the animation images from which the 2D image is configured and data including the textures from which the pseudo 3D image is configured are stored in the frame buffer. This leads to an increase of amount of data which are required at a period of time in a game, and consequently, causes a game device to hesitate more frequently due to rewriting of data in the frame buffer.

In the method which the images are previously stored in the frame buffer, when scene of the game is dramatically changed, for example characters in the game and the background become quite another, as a result, data which are required to produce the new changed image are absent in the frame buffer, it is required that contents in the frame buffer are rewritten to the required data. This rewriting process is to transfer the data from the storage medium or the main memory to the frame buffer. In particular, when the data are transfer from the storage medium to the frame buffer, it takes several seconds to transfer the data. In some case, it takes long time enough to suspend the game.

Especially, in the game having thrilling story or dynamic continuous movement, the suspension of the game dampen the interest of the user and may become a fatal defect. Therefore, the suspension of the game must be avoided at any cost.

However, capacity of the frame buffer is generally about one megabytes to four megabytes and is restricted based on hardware configuration. Therefore, it is not easy to increase the capacity of the frame buffer. Because of this, in general games, the suspensions happen several times or dozens of times from the start of the game to the end of the game due to the rewriting.

The simplest way to avoid the suspensions due to rewriting is to rewrite at the scene which is insensitive to the suspension. Generally, in a game, there are some scenes where the user vacillates this way and that without operations or no updating of the image is required. If the rewriting of the image is executed in such scenes, user seems that the story of the game proceeds without hesitation. However, the technique often depends of nature, contents, story of the game. Therefore, the technique has restriction in that the time points when the rewriting of the image should be executed are limited to some timings.

Another technique to avoid the hesitation is to analyze the story of the game, strictly select the required data in the frame buffer, and partially store the required data (a small amount of data at a time) in an area where the unused data are stored. Thereby, rewrite processes are distributed and it is possible to reduce the probability that user seems that the game suspends. However, in this technique, it should be determined which data in the frame buffer are required for each scene of the game. The determination depends on the pattern of transition of the story of the game, as a result, extremely increases the complexity of the design of the game and the load of the CPU of the game device.

Still another method to avoid the hesitation is to reduce the amount of data in the frame buffer. As a result, the number of rewritings of the frame buffer is reduced or become zero. However, this leads to reduce the number of colors or image pattern. A game using a small number of colors may not have great power of expression, and a game which repeat displaying of the same scenes or the same characters may not supply strong impression to the users. Therefore, these game may not compete on the market in view of development of many types of games.

Thus, aforementioned techniques include fatal defects and the suspension problem due to rewriting of the frame buffer is not resolved essentially.

SUMMARY OF THE INVENTION

Therefore, it is an object of the invention to provide a video game device, image display method, and storage medium for simultaneously displaying a 2D image and a pseudo 3D image on a display device.

It is another object of the invention to provide a video game device, image display method, and storage medium which may not require to rewrite data in a frame buffer for a long time without dependency on contents, nature, and story of the game, without increasing complexity of game program and load of CPU, and without reducing power of expression and impression of the game.

According to a first aspect of the invention, there is provided a video game device having a frame buffer which includes a first area storing a first image used in a game, and a game image displaying device which displays the first image to a display device. The video game comprises a game image producing device which produces the first image on the basis of proceedings of the game by combining a 2D image and pseudo 3D image and a game image storing device which stores the first image into the first area. Further, the game image displaying device displays the first image which is produced by the game image producing device and is stored by the game image storing device into the first area, to the display device.

According to the video game device of the invention, it is possible to display the 2D image which may represent a detail expression of a character and the pseudo 3D image which may represent a 3D space in which images are changed according to a viewpoint of the character, to the display device simultaneously.

According to a second aspect of the invention, there is provided another video game device having a frame buffer which includes a first area storing a first image used in a game, and a game image displaying device which displays the first image stored in the first area to a display device. The video game device comprises a second area which is included in the frame buffer and stores second images used to produce the first image, a game image producing device which when the first image includes change parts which change according to passage of time, reproduces the first image by using the second images which correspond to the change parts of the first image, and a game image storing device which stores the reproduced first image into the first area. Furthermore, the game image displaying device displays the reproduced first image to the display device, each of the second images is partial image subdivided in a predetermined size, each of the second images is stored in the second area in consideration of a relationship of an orientation between an image to be stored in the second area and the image to be displayed, and the size, the location, and the orientation of each of the second images to be stored into the second area is optimized so that the interval of accessing to a storage medium other than the frame buffer for producing the first game image is extended.

According to the video game device, it may not require to rewrite data in a frame buffer for a long time without dependency on contents, nature, and story of the game, without increasing complexity of game program and load of CPU, and without reducing power of expression and impression of the game.

DESCRIPTION OF THE PREFERRED EMBODIMENT

Figure 1:
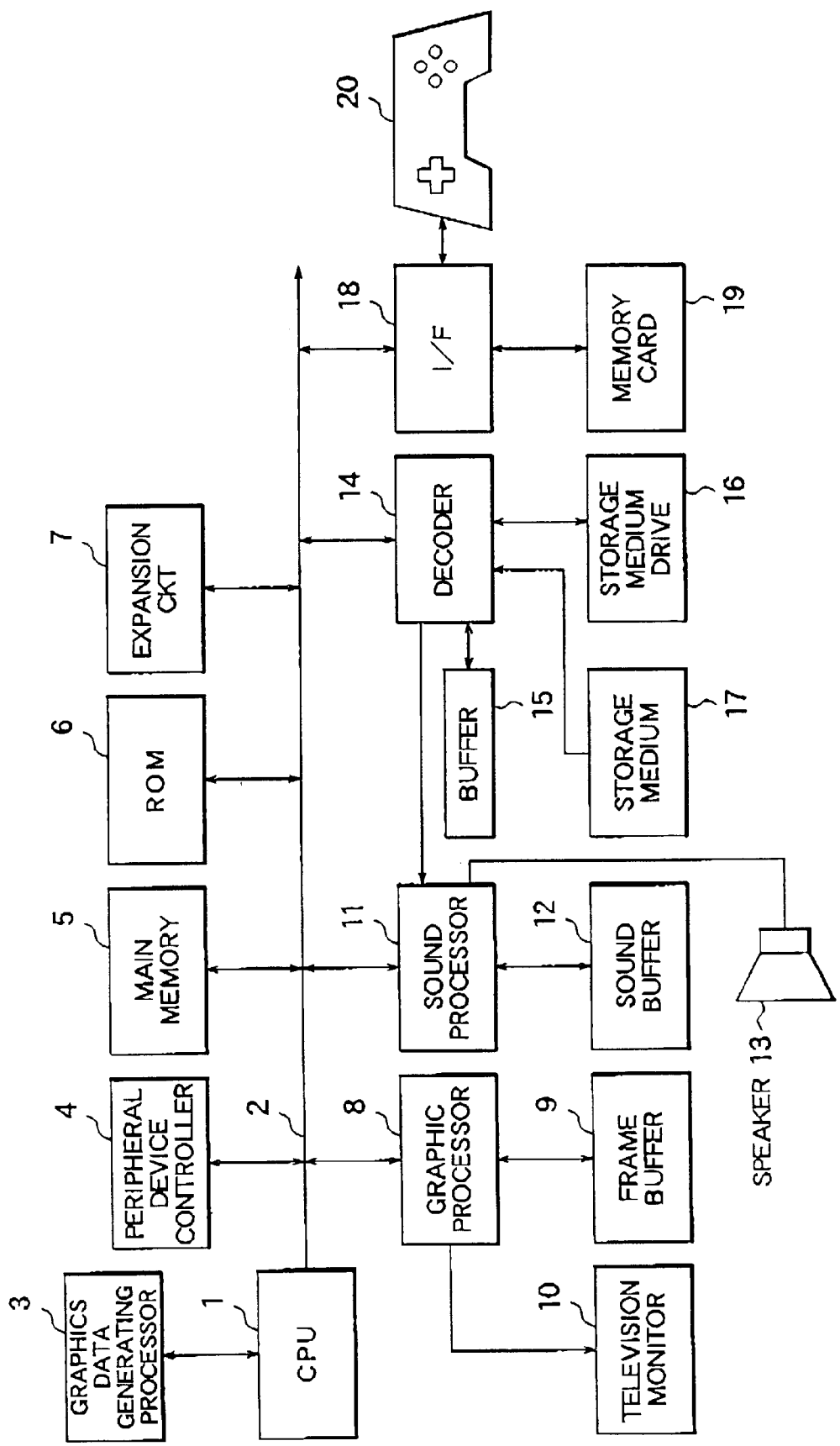
FIG. 1 shows a block diagram of a video game device according to an embodiment of the invention.

FIG. 1 shows a block diagram of a video game device which may achieve the invention. The video game device is the same as a device disclosed in Japanese Laid-Open Publication No. H08-235366 (namely, 235366/1996), "image information producing device and method, and image information processing device and method". As shown FIG. 1, the video game device implementing the invention includes a body and elements which are connected to the body. The elements include a television monitor 10, speaker 13, memory card 19, a controller 20. The configuration of the video game device is an example for a game device for family use.

The body further includes a CPU 1, a bus 2 which is connected to the CPU 1, and constituents which are connected to the bus 2.

The bus 2 is configured of an address bus, a data bus, and a control bus. And a graphics data generating processor 3, a peripheral device controller 4, a main memory 5, a ROM 6, an expansion circuit 7, a graphic processor 8, a frame buffer 9, a sound processor 11, a sound buffer 12, a decoder 14, a buffer 15, a storage medium drive 16, and an interface circuit 18 are connected to the bus 2.

Also, the television monitor 10 (hereinafter, is simply referred to as "monitor") is connected to the graphic processor 8, the speaker 13 is connected to the sound processor 11, and the memory card 19 and the controller 20 are connected to the interface circuit 18.

The storage medium 17 stores a program and data which are required to execute a game. The contents of the program and the data are supplied via the storage medium drive 16 to the game device. The storage medium includes, for example, a portable storage medium, such as a cd-rom and an optical disk.

As described above, this configuration is adapted to a game device for family use. In this case, for example, the monitor 10 may be a monitor of a domestic television, and the speaker 13 may be a speaker of the domestic television.

In the case where an arcade game device implements the method of the invention, the elements shown in FIG. 1 may be incorporated to one package.

Alternatively, when a personal computer or a workstation computer implements the method of the invention, the monitor 10 may be a CRT display connected to the computer, and the controller 20 may be an input device, such as a keyboard or mouse of the computer.

Next, more detailed description is made about the constituents shown in FIG. 1. The CPU 1 depicted is, for example, a 32-bit RISC (reduced instruction set computer) CPU, which controls the whole device by executing the operating system stored in the ROM 6.

The graphics data generating processor 3 serves as a co-processor of the CPU 1. That is, the graphics data generating processor 3 performs co-ordinates conversion and light source calculating (for example, calculation of matrix including fixed point elements and vector operation) in parallel in order to display a pseudo 3D image.

The peripheral device controller 4 performs interrupt control, time control, memory control, and control for direct access memory (DMA) transfer.

The Rom 6 stores the operating system which controls operation on each element.

The expansion circuit 7 decodes still or animated image data read out from the storage medium 17 and stored in the main memory 5, under the control of the aforementioned CPU 1, and stores the decoded image data back in the main memory 5. Specifically, the expansion circuit 7 is capable of high-speed execution of inverse discrete cosine transform (inverse DCT) operations, and it is also capable of expanding compressed data read out from the storage medium 17 in accordance with still color image compression standards (known as JPEG) or cumulative media moving image encoding standards (known as MPEG).

The graphic processor 8 renders polygon images and stores them into the frame buffer 9 in response to instructions from the CPU 1.

The frame buffer 9 includes display area and non-display area. The display area is an area in which images corresponding to a display area on the monitor 10 are stored. The non-display area is an area in which animation images used to produce 2D images in the display area and textures used to produce pseudo 3D images are stored.

In some case, the frame buffer 9 includes a color lookup table (CLUT) which corresponds a color of pixel to a number. Also, data in the display area in the frame buffer 9 are transferred to the monitor 10 at high-speed. The frame buffer 9 consists of a so-called dual-port RAM, and it is capable of simultaneously receiving images from the graphics data generating processor 3 (CPU 1) or transferring data from the main memory 5, and reading out data in order that the data can be displayed to the monitor 10.

The sound processor 11 outputs music or an effective sound via speaker 13 by regenerating ADPCM data in the storage medium 17 or voice data stored in the sound buffer 12, or by modulating and regenerating the voice data.

The decoder 14 decodes a program or data which are stored in the storage medium 17 and are appended an error checking and correction (ECC) code, and provides the program or the data to the main memory 5 or the sound processor 11.

The buffer 15 is temporarily stores the program and/or data regenerated from the storage medium 17. The buffer 15 is, for example, 32 kilobytes of buffer.

The storage medium drive 16 may be cd-rom drive, optical disk drive and the like. The storage medium drive 16 reads out a program and another data from the storage medium 17, and provides them to the decoder 14.

The interface circuit 20 sends an operation signal received from the controller 20 to the CPU 1. Also, the interface circuit 20 reads out the contents of the memory card 19 to supply the contents to the main memory 5, simultaneously that, stores data into the memory card 19 in response to an instruction of the CPU 1.

The memory card 19 stores values of a various of parameters in order to, for example, maintain the status at the time point when a game terminates last time. Herein, a card type memory is used as the memory card 13, but many types of memories may be used.

The controller 20 is used to play a game by a user. The controller 20 includes direction buttons for moving a character on the monitor upwards, downwards, leftwards and rightwards, and a plurality of function buttons for instructing one of specific functions, for example, starting the game or selecting items.

Next, the contents of the frame buffer 9 in a video game device according to the invention are described in more detail with reference to FIG. 2. The frame buffer 9 includes a capacity of a height of 512 pixels by a width of 1024 pixels and there is two bytes (sixteen bits) of information for each pixel. Therefore, whole capacity of the frame buffer 9 is 1,048,576 bytes (512×1024×2 bytes), that is one megabytes.

In this event, the pixels along the width may be called zero-th through 1023-th pixels (0 to 1023) while the pixels along the height may be called zero-th through 511-th pixels (0 to 511).

Figure 2:
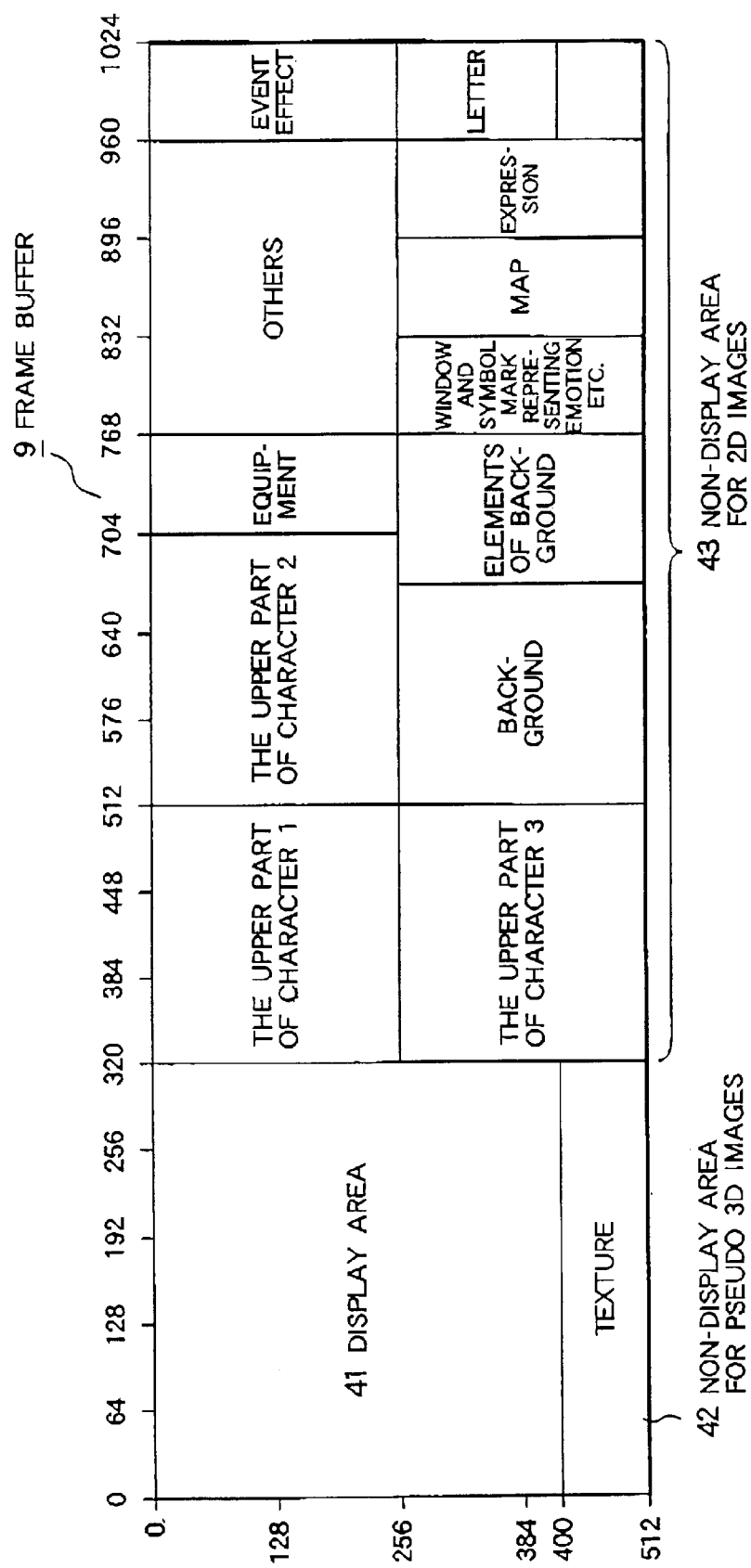
FIG. 2 shows an example of an layout of a frame buffer of the video game device according to an embodiment of the invention.

In the frame buffer 9, pixels ranged between 0–399 in height and between 0–319 in width are assigned to a display area 41 depicted in FIG. 2 and the other pixels in the other range are assigned to a non-display area.

The size of the display area 41 may vary for each game or scene of the game based on resolution of the game. In this case, the display area 41 includes a height of 400 pixels by a width of 320 pixels, but when images are required to display on the monitor 10 at higher resolution, larger size of the display area, such as an area of a height of 400 pixels by a width of 512 pixels, is required. Therefore, when different images are displayed to the same size on the monitor 10, one image having a height of 400 pixels by a width of 512 pixels is displayed at higher resolution than the resolution of the other image having a height of 400 pixels by a width of 320 pixels. This is because the former image has larger number of pixels in the same display area. Also, when the capacity of the display area 41 is increased, the capacity of the non-display area is reduced and the size or the number of patterns of images stored in the non-display area are limited, since the frame buffer 9 has the fixed capacity (herein, one megabytes).

The non-display area of the frame buffer 9 includes a non-display area for pseudo 3D images 42 and a non-display area for 2D images 43. The non- non-display area for pseudo 3D images 42 resides in an area which is ranged between 0–319 in width and between 400–511 in height, is assigned to store data which are used to produce the pseudo 3D images, that is texture. The non-display area for 2D images 43 resides in an area other than the display area 41 and the non-display area for pseudo 3D images 42, and is assigned to store data which are used to produce the 2D images, that is animation images etc.

The non-display area for 2D images 43 is divided into several sections based on categories of an object to be displayed to simplify management of the images. The size of the non-display area for pseudo 3D images 42, the size of the non-display area for 2D images 43, and the sections in the non-display area for 2D images 43 may vary for each game or scene of the game, as similar to the display area 41.

The frame buffer 9 shown in FIG. 2 may be used, for example, in the following game. In the game, a user of the game selects two characters among three characters (character 1 to 3) and controls them to perform a various of operations, for example, to combat with enemy characters using the controller 20. Movements of the characters are displayed using pseudo 3D images. Under a certain condition, the upper part of two or three characters are displayed using 2D images and the user has a conversation with the characters in the game. In this point, the pseudo 3D images are displayed as background of the 2D images. In some case, the 2D images are displayed as background. The 3D images displayed as background may be continuously changed based on a predetermined routine simultaneously with change of the 2D animation images.

Using the 2D animation images, the character who has a conversation is displayed naturally on the monitor 10 since a mouth, hair, and an expression of the character change delicately.

Figure 3:
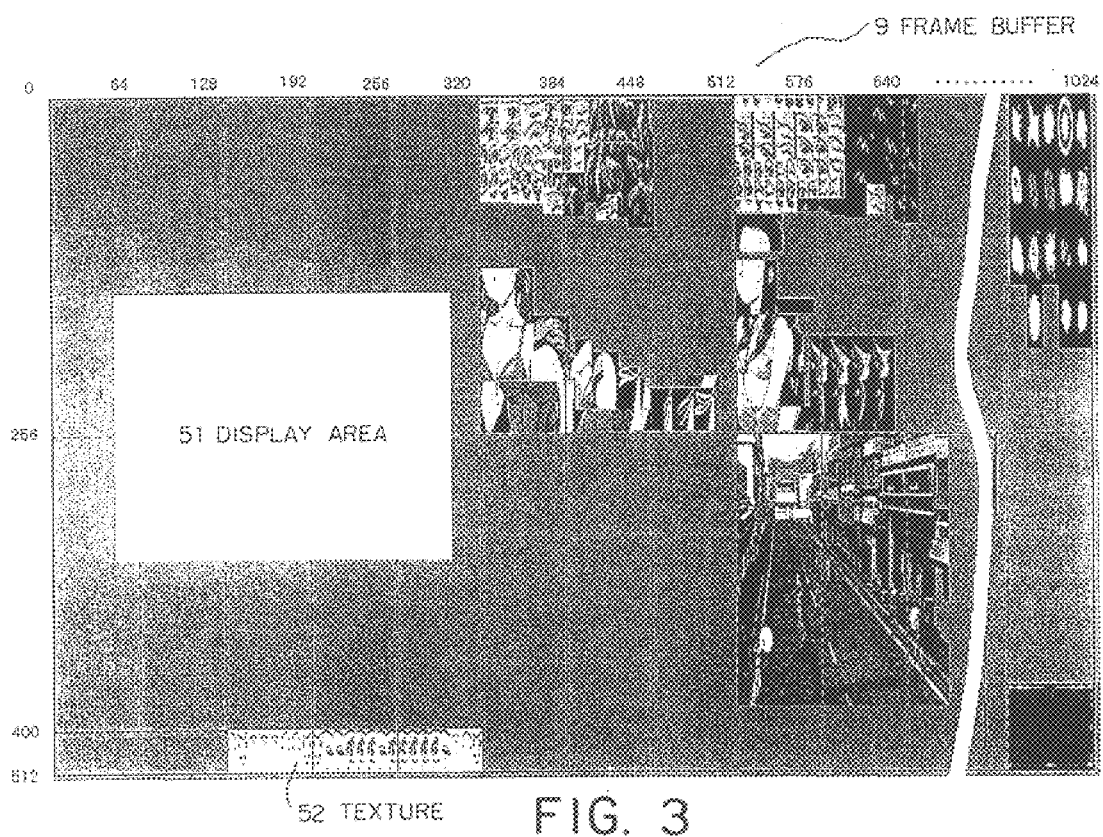
FIG. 3 shows contents of the frame buffer shown in FIG. 2.

Then, description is made about an actual data in the frame buffer 9 with reference to FIG. 3. FIG. 3 shows the actual data in the frame buffer 9 stored along with the layout of the frame buffer shown in FIG. 2. However, representation is omitted about the actual data in a right part of the frame buffer shown in FIG. 3.

In FIG. 3, the frame buffer 9 is divided sections each of which has the size of 64 pixels wide×256 pixels height. However, these sections are defined in order to simplify management and ease understanding. Furthermore, an area which is ranged between 0–319 in width and between 0–399 in height is a display area 51 which corresponds to the display area 41 shown in FIG. 2. In FIG. 3, no data are shown in the display area 51, but when the user play the game, images to be displayed on the monitor 10 are repeatedly produced in the display area 51 at high-speed, such as 10 frames per second to 60 frames per second.

As described above, a color of each pixel may be represented by relating the pixel to a color identification number which is defined by the CLUT. However, herein, each pixel itself has color information (for example, a set of values of RGB) and the pixel is colored by the color information. Therefore, an image defined as the display area 51 is directly displayed on the monitor 10 connected to the video game device.

A texture 52 is stored in a location corresponding to the display area for pseudo 3D images 42 shown in FIG. 2. The texture 52 includes a dozens of expression patterns of enemy character's eye. In a game, one of the expression pattern is selected according to a status of an enemy character and the selected pattern is put on a polygon in a location corresponding to the enemy character's eye.

Images required to represent a character 1 as 2D images are stored in a location corresponding to the area to be stored to represent the upper part of character 1 in the non-display area for 2D images shown in FIG. 2. The images in the area includes a plurality of stripped images and it is not clear what the images subsequently represent. However, when a part of images are selected and combined based on instructions from the CPU 1, groundwork for an image of the upper part of character 1 is produced in the display area 41.

In this example, the stripped images are stored in the same orientation as the orientations of images to be displayed in the display area 51. However, in order to use the frame buffer 9 effectively, each of the stripped images may be stored in an orientation (for example, lengthwise or breadthwise) different from that of the image to be displayed.

Specifically, when a rectangular image (representing an eye and including a width of 20 pixels by height of 10 pixels) is put on a location in the display area 51, the image is generally stored in the non-display area for 2D images 43 in the same orientation as the image to be displayed in the area 51. However, there may be no space in the area 51 to store the rectangular image in the original orientation. In this case, when the area includes an empty space defined a width of 10 pixels by a height of 20 pixels, the rectangular image may be stored in the area 51 as an image having a width of 10 pixels by a height of 20 pixels by rotating the image clockwise (or counterclockwise) by an angle of 90 degrees. The image is rotated back counterclock-wise (or clockwise) by an angle of 90 degrees when the image is put on the display area 51.

The area corresponding to the area of the upper part of character 1 shown in FIG. 2 further includes changed images which are used to display a part of the character 1 which changes. When the upper part of the character 1 displayed in the display area 51 changes a little according to the condition of a game or user's instruction (for example, when the character closes eye, or moves mouth to talk to, or hair flows in the wind), the changing parts of the character 1 in the display area 51 is replaced with the corresponding changed images and displayed on the monitor 10. In the next frame, another changed image is put on a part of the character 1 in the display area 51 and displayed on the monitor 10. By repeating such a process, for example, expression of hair of character 1 swaying in the wind any number of times is achieved.

Generally, delicate changes of an expression of the character is represented in a little part of an image of the character. Therefore, in this case, the part which is of the image of the character 1 and substantially changes is very small. However, such an image data previously used are, for example, managed in a unit of face. Thus, when there are five image patterns that the character open/close his/her mouth to talk to, five images are required each of which corresponds to one of the pattern and includes whole face image.

According to the invention, in such a case, required capacity of image data is remarkably reduced because the image pattern is managed in a unit of a part of face, for example, a mouth.

Proceeding this idea, the unit may be reduce to a pixel, then efficiency of usage of the frame buffer become the best in that unchanged data is not stored redundantly. However, if the unit is small, the number of putting images on the display area 51 tends to be increased, as a result, load of the CPU 1 is increased.

Further, it is hard to collect a number of the tiny images. Therefore, the size of the image to be prepared should be determined by comparing the merit that the frame buffer 9 is used effectively with the demerit described above. Also, the size of the image is not always fixed for all the images.

As similar to the character 1, in areas corresponding to the character 2 and the character 3, images which corresponds to the changing part of the characters are prepared. Further, the stripped image data is illustrated in connection with display of 2D image, however, the stripped image data may also be applied to the textures 52 which are used to display the pseudo 3D image.

In the above embodiment of the invention, using the stripped image data, the capacity of image data which are used to display the pseudo 3D images is extremely saved in addition to the reduction of the required capacity of the frame buffer. In general, the capacity of textures which are mapped to polygons becomes huge, however in the invention, the textures are mapped to only polygons in a part of a face (for example, a part of the face such as eye) of a main character and mapping to the other polygons is avoided.

Further, there is no need to prepare textures of objects configuring a background in the frame buffer 9, because the background and objects in the background which are generally represented using the pseudo 3D images including polygons are each represented by a image (the image is stored in the areas of background and elements of background in the non-display area for 2D images shown in FIG. 2). In the method, it is possible to further reduce the capacity required in the frame buffer 9 while maintaining power of expression in the pseudo 3D images to some extent.

The frame buffer 9 shown in FIG. 3 is merely illustrated, Indeed, all the areas in the frame buffer 9 are filled with images except for the display area 51. Further, images shown in the frame buffer 9 are displayed with a vertical length which is longer than a vertical length actually displayed on the monitor 10, but this is not essential since difference of an aspect ration for arrangement of pixels.

Figure 4:
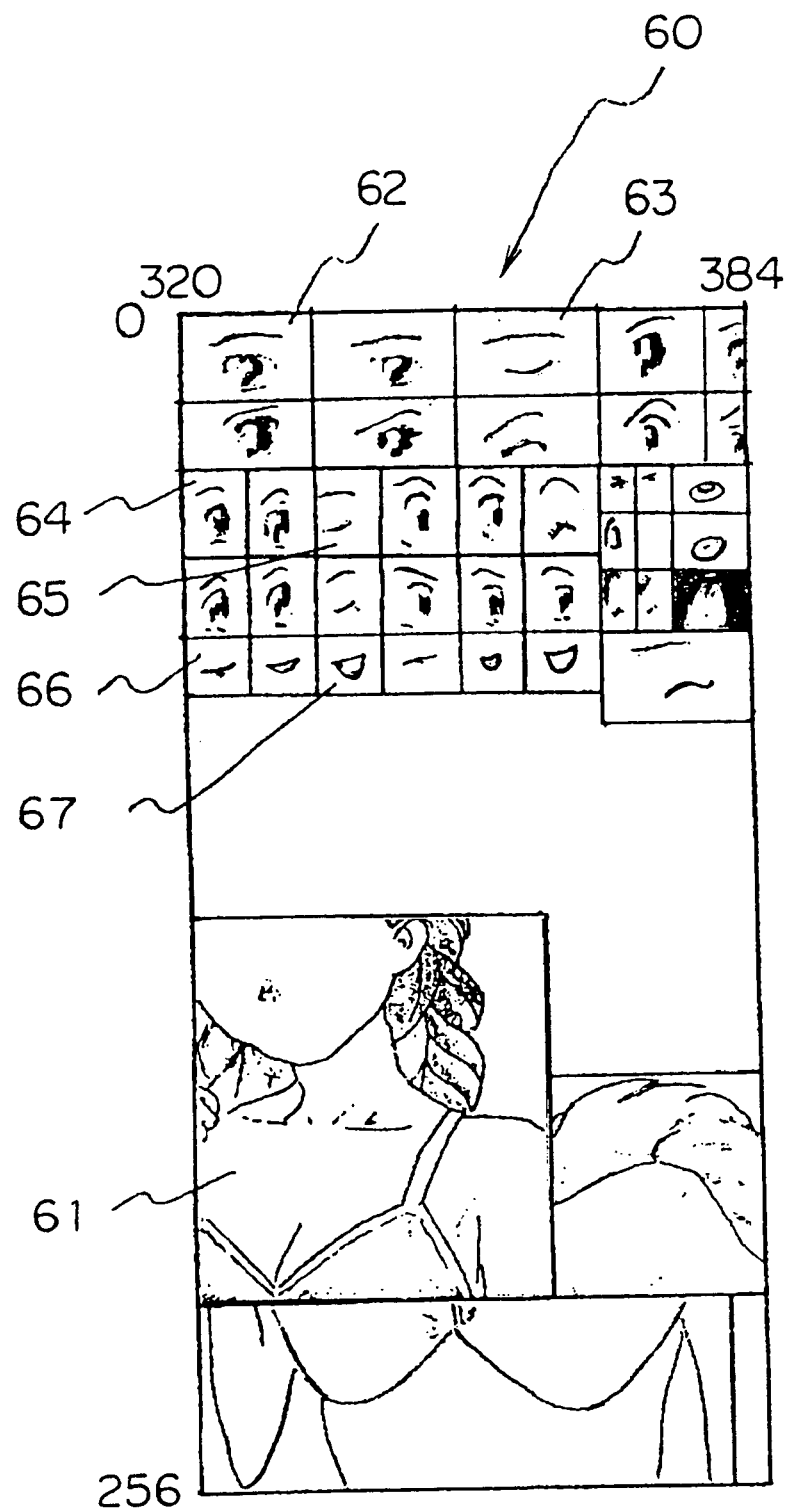
FIG. 4 shows an enlarged view of a part of the contents of the frame buffer shown in FIG. 3.

Next, description is made about a process of replacing the changed part of an image with reference to FIGS. 4 and 5.

FIG. 4 shows an enlarged area 60 corresponding to the area which is shown in FIG. 3 and ranged between 320–383 in width and between 0–255 in height. This area 60 stores images which may represent motion (change) of a character for a certain period in a game. Therefore, there are a plurality of images for the same part of the character.

The area 60 stores images corresponding to a part of the character such as eyes (62–65) and mouths (66, 67) in the upper section. The area 60 further stores images corresponding to an outline of the character such as the whole upper part (61) and a body. Herein, in the images corresponding to eyes (62–65), the images which resides in the first and second rows including images 62 and 63 are used to represent a plurality patterns of left eyes of the character (right side of the character as you face him/her). The images which resides in the third and fourth rows including images 64 and 65 are used to represent a plurality patterns of right eyes of the character (left side of the character as you face him/her).

It is possible to produce a various expressions of character such as when the character cries or laughs by only replacing with the image representing eye of the character. The image representing eye is stored in a unit of eye (and eyebrow). Therefore, the capacity of the image is less than the capacity when the image is stored in a unit of face. In other word, a larger number of expressions may be represented using the same capacity.

Figure 5A:
FIGS. 5A and 5B show image examples which are produced using the contents of the frame buffer shown in FIG. 3.
Figure 5B:

FIGS. 5A and 5B show images which are produced using the images in the area 60 shown in FIG. 4. FIG. 5A shows image 71 displayed at a time point. And FIG. 5B shows image 72 displayed at a frame next or after a several frames later from the image 71. When images are displayed in the order FIG. 5A to FIG. 5B, it is seems that the character closes eye and is going to start talking.

Herein, method of producing each image is described. To produce the image 71 shown in FIG. 5A, at first, the image 61 in the area 60 shown in FIG. 4 and an image represent the upper part of head (read from an are other than the area 60) are concatenated to produce an image of the upper part of the character, and the concatenated image is stored into the display area of the frame buffer 9. At this point, areas corresponding to eyes and mouth are empty. Then, the image 62 in the area 60 is put on an area corresponding to a left eye of the character and the image 64 in the area 60 is put on an area corresponding to a right eye. Furthermore, image 66 in the area 60 is put on the area corresponding to the mouth. As a result, the image 71 is produced to represent a usual expression.

The image 72 shown in FIG. 5B is produced by overlapping the changed images on the image 71. At first, the image 63 in the area 60 shown in FIG. 4 is overlapped on the area corresponding to the left eye and the image 65 is overlapped on the area corresponding to the right eye. Then, the image 67 in the area 60 is overlapped on the area corresponding to the mouth to produce the image 72 which represents the expression of the character who closes eyes and start talking.

It is possible to display images as the character moves continuously by producing the images as described above and displaying the images one after another. Herein, the changing part of the character is stored in a unit of small size area such as eye and mouth. Therefore, using even if a small capacity of the frame buffer, it is possible to obtain abundant power of expression.

The desirable size of the area depends on characteristic of game images which transit for a period of time. Therefore, the size of the area is manually determined after trial and error. However, if a series of game images may be all read as data, using a computer, the following process may be performed. The process causes a load of developer of a game to reduce remarkably.

At first, the process executes the steps of focusing a series of movement of a character, selecting a plurality of images representing the movement of the character, accumulating parts which occur at least one change among the selected images, defining a plurality of rectangular areas so that the parts may be all covered. Next, if the size of the rectangular area is not desirable, the rectangular area is divided into a plurality of smaller size of rectangular areas.

Then, the process further executes steps of accumulating parts which occur at least one change in the divided rectangular area, and defining the smallest rectangular area so that the parts may be all covered. The accumulating step and the defining step are repeated until size of the each defined area are reduced to be desirable.

As a result, images representing the changing part are prepared in a unit of the defined desirable size of rectangular area. For example, images representing eye or mouth are defined in a unit of the size covering the eye or the mouth. The images then transferred to the frame buffer 9.

The desirable size depends on the power of expression of the game, or a period which a game should continue displaying images without replacing the frame buffer.

Figure 6:
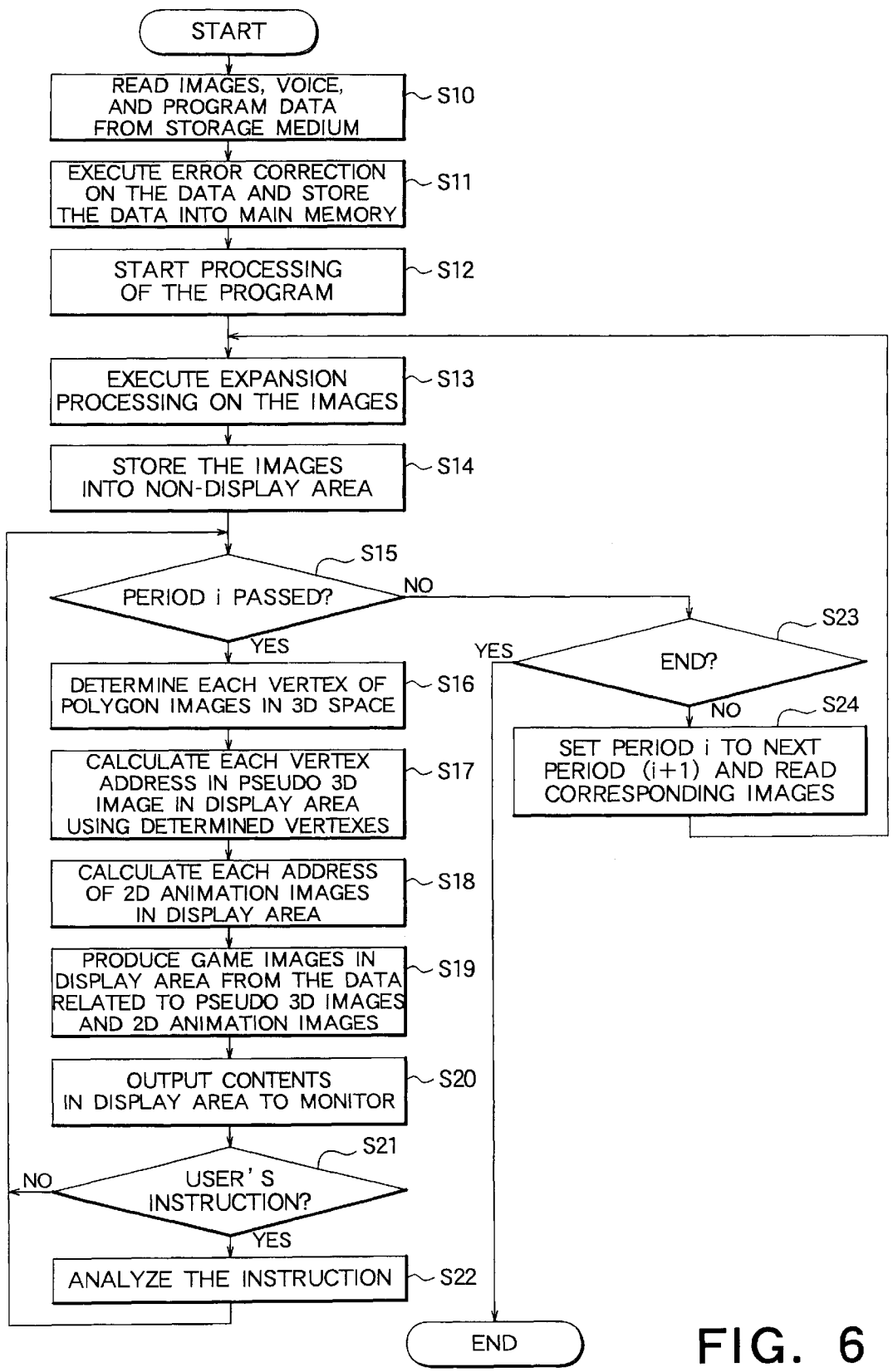
FIG. 6 shows a flow chart representing rendering and displaying process at a video game device according to an embodiment of the invention.

Next, steps of rendering and displaying 3D images and pseudo 3D images according to an embodiment of the invention are described with reference to FIG. 6. FIG. 6 shows a flowchart of the steps.

The process is started when the storage medium 17 is set to the video game device which has been powered on, or when the video game device is powered on with the storage medium 17 in the video game device.

At first, the storage medium drive 16 reads out images, voice, and program data from the storage medium 17 in step S10.

Then, the decoder 14 performs ECC operation on the read data and stores the data into the main memory 5. But, the voice data may be directly transferred to the sound processor 11 as required and then the voice data are stored into the sound buffer 12 in step S11.

In step S12, the program data stored in the main memory 5 are started as game program.

Next, the expansion circuit 7 performs expansion operation on the image data stored in the main memory 5 based on its compressed format, and stores back the data into the main memory 5 in step S13.

In step S14, image data which are used to produce 2D images and pseudo 3D images required for a predetermined period time (i: a period in the game) are transferred from the storage medium 17 or the main memory 5 to the non-display area in the frame buffer 9. At this point, a plurality of image data are stored in predetermined locations in the frame buffer 9 as shown in FIG. 3.

The predetermined period time i is not the fixed period, for example five or twenty minutes, but a predetermined game period which the game may continue displaying images on the monitor 10 using only once stored image in the frame buffer 9. Therefore, when a various of scenes and a plurality of colorful images are frequently used, the predetermined period time becomes comparatively short since the number of patterns of image to be used becomes large.

On the other hand, when a monotonous scenes are simply displayed, the predetermined period time becomes comparatively long since only using images in the non-display area, display of the image on the monitor 10 continues for a long time.

However, according to the invention, the predetermined period time is extended in the two cases since each changing part of the image is stored as a small area of image data into the frame buffer 9.

In step S15, it is determined whether or not images to be displayed next frame belongs to the current predetermined period time based on the scenario of the game or user's instructions. If the images belongs (step S15(Y)), process proceeds to step S16.

In step S16, required calculations about the pseudo 3D image are performed by the CPU 1. The CPU 1 determines coordinates (polygon vertex coordinates) of each vertex of each polygon in the 3D space to be displayed, and address data (in the non-display area in the frame buffer 9) of textures put on each polygon. When a part of the texture is changed, the CPU 1 determines address data in the non-display area of the frame buffer 9 in which image data corresponds to the changed part are stored to replace only the changed part.

Next, in step S17, each of the polygon vertex coordinates in the 3D space determined in step S16 is supplied to the graphics processor 3, and then the polygon vertex address data and brightness of the corresponding texture etc. are determined so that that the polygon vertex coordinates in the 3D space may be represented to the monitor in 2D space.

Then, in step S18, a required calculation for displaying the 2D image is performed by the CPU 1. The CPU 1 determines the first address data in the display area of the frame buffer 9 and second address data in the non-display area of the frame buffer 9. The first and the second address data are of animation images prepared to display image. Herein, when a part of the animation image is changed, address data of the corresponding new image in the non-display area are determined in order to replace the changed area with the corresponding new image.

Next, in step S19, required data, which are obtained from steps S16 to S18, about the pseudo 3D images and the 2D images is supplied to the graphic processor 8. Then, the graphic processor 8 produces a game image to be displayed on the monitor 10 from the supplied data and stores into the display area of the frame buffer 9. In the embodiment of the invention, firstly, each of the textures in the non-display area is put on the corresponding polygon to produce the pseudo 3D images, and then the animation images in the non-display area are overlapped on the pseudo 3D images. As described above, when a part of the images is changed, for example, a character displayed in an animation image closes his/her eyes, only an image which represents the eyes closed is read from the non-display area and the image is put on the display area in the corresponding location.

In step S20, when producing of the game image in the display area is completed, the contents of the game image are transferred to the monitor 10 at high-speed.

In step S21, it is determined whether or not there is an instruction (for example, to display a menu or to move an object) from a user via the controller 20 and the interface circuit 18. When there is no instruction (step S21(N)), process goes back to step S15. When there is an instruction (step S21(Y)), process proceeds step S22, analyzes the instruction, and goes back to step S15. The instruction is evaluated in step S15 and processing corresponding to the instruction is performed.

Processing in the loops between steps S15 and S21, and steps S15 and S22 is performed at high-speed in a game displaying moving images to the monitor 10. In general, the processing is repeated 10–60 times per second (that is, 10–60 frames per second (fps)).

In step S15, when it is determined that the current scene does not belong to the period i no longer (step S15(N)), process goes to step S23 and determines whether the game ends or not. When it is determined that the game ends (step S23(Y)), the process terminates. The game is ended by a various of events such as user's instruction (for example, suspend instruction and terminate instruction).

When it is determined that the game is still continued (step S23(N)), process goes to step S24. This is when a scene of the game is drastically or dramatically changed, as a result, replacing of contents in the non-display area of the frame buffer 9 occurs. Therefore, in step S24, the period is set to the period i+1 which is next to the period i, image data required in the period i+1 are read out from the storage medium 17 or from the main memory 5. Then, process return to step S13, wherein expansion process are performed on the image data from the storage medium 17. Then, in step S14, the image data are stored into the non-display are of the frame buffer 9.

The order of the processing as described above, in particular the rendering process and the determination of user's instruction may vary. Therefore, the method of the invention should not be limited to the order. For example, processes in steps S16–S17 and process in step S18 may be switched or performed simultaneously.

Further, the method of the invention may apply to a video game device different from the embodiment of the invention. For example, a video game device may use a plurality of frame buffers, but even in this case, according to the invention, the non-display area in the frame buffers may be used efficiently.

Next, description is made about an example of image displayed on the monitor 10 according to an embodiment of the invention.

Figure 7:
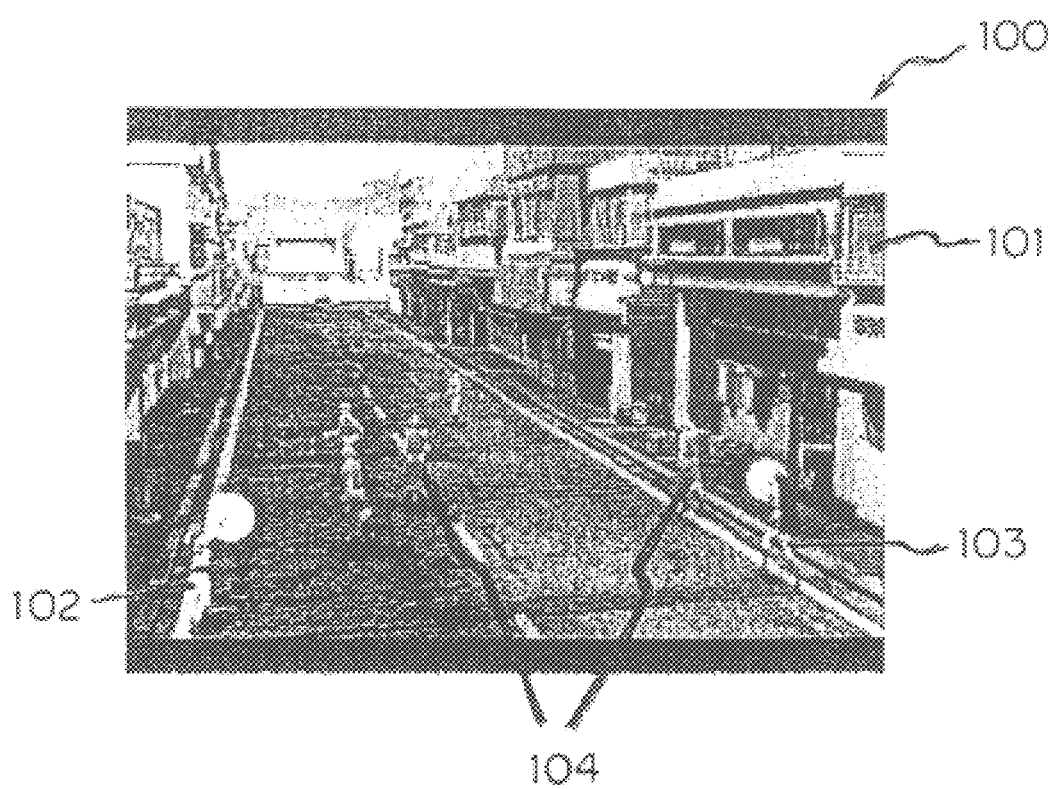
FIG. 7 shows an example of image displayed on a monitor at a time point according to an embodiment of the invention.
Figure 8:
FIG. 8 shows an example of image displayed on a monitor at another time point according to an embodiment of the invention.
Figure 9:
FIG. 9 shows an example of image to be displayed as a frame next to the image shown in FIG. 8.

FIG. 7 shows an image displayed on the monitor 10 at one time point. FIG. 8 shows another image displayed on the monitor 10 at another time point. FIG. 9 shows still another image displayed on the monitor 10 as a frame next to the image shown in FIG. 8.

The image 100 shown in FIG. 7 represents combat scene in a town 101, and wherein, two characters (102, 103) shoot at an enemy character 104 based on instructions of user via the controller 20. When the two characters drive the enemy character into the depth of the town based on the instructions of user, a viewpoint of the game moves to the depth of the town according to the movement of the characters because the image 100 is represented using the pseudo 3D images.

The image 120 shown in FIG. 8 represents two characters (122, 123) displayed using the 2D animation images with a background representing a town and displayed using the pseudo 3D images. Furthermore, in the lower part of the image 120, an area 124 is located and a talk of the characters (122, 123) is represented as letters in the area 124.

The image 120 shows a scene when the two characters (102, 103) shown in FIG. 7 need to have a conversation in combating. To represent this situation, the upper part of the characters are shown on the image 100 shown in FIG. 7 in close-up style. The character 122 shown in FIG. 8 corresponds to the character 102 shown in FIG. 7. The character 123 shown in FIG. 8 corresponds to the character 103 shown in FIG. 7. Thus, the characters (102, 103) are shown in small size as fitted into the background in FIG. 7, but when a condition is satisfied, the characters are shown in more detail as 2D images of enlarged upper part of the characters.

The image 140 shown in FIG. 9 shown two characters (142, 143) which are displayed using the 2D animation images and who are substantially the same as characters shown in FIG. 8 with background which is displayed using the pseudo 3D image and represents the town as similar to the town shown in FIG. 8. Further, the image 140 includes an area 144 as similar to the area 124 in the lower part, and a talk of the characters (142, 143) is displayed in the area 144.

There is no difference between the contents of the background shown in FIG. 8 and FIG. 9. Further, in FIGS. 8 and 9, the substantially same two characters are displayed in the same locations.

However, comparing the characters shown in FIG. 8 with characters shown in FIG. 9, the character 142, 143 in FIG. 9 are different from the corresponding characters 122, 123 in FIG. 8 in that the size of the opening mouth and the opening eyes, and the form of hair are different from each other.

The images shown in FIG. 8 and FIG. 9 represent only two scenes which are very close in time. However, when such a change between the images is supplied over a great number of frames, the characters etc. are added to expression of natural motion. In this example, expression of talking characters is realized by changing the size of opening mouth one after another. Further, expression of flowing hair in the wind is realized by changing the form of hair in order.

As described above, the transitional change is performed by replacing only the changed part of the image (for example, only mouth part or only front hair part) in the display area of the frame buffer 9 with the corresponding new area.

According to the invention, the 2D images and the pseudo 3D images may be displayed simultaneously on the display device.

Further, according to the invention, it is no need to rewrite data in the frame buffer for a long time in a game, without regard to the contents, the characteristics, and the story of the game, and without causing the power of expression and impression to degrade.

What is claimed is:

1. A video game device having a frame buffer which includes a first area storing a first image used in a game, and a game image displaying device which displays the first image to a display device, comprising:

a game image producing device which produces the first image on the basis of proceedings of the game by combining a two-dimensional image and pseudo three dimensional image; and a game image storing device which stores the first image into the first area, the game image displaying device displays the first image which is produced by the game image producing device and is stored by the game image storing device into the first area, to the display device, wherein the frame buffer further includes a second area in which second images used to produce the first image are stored, and the game producing device replaces change parts of the first image being displayed with the corresponding second images to produce the first image, and wherein each of the second images is partial image subdivided in a predetermined size, and stored into a predetermined location in the second area in consideration of a relationship of an orientation between an image to be stored in the second area and the image to be displayed, and wherein the second images include images representing changes according to passage of time in a part of the first image and thereby the number of times of accessing to the frame buffer is reduced by replacing parts of the first image with the second images one after another.

2. The video game device claimed in claim 1, further comprising:

a first area defining device which selects a plurality of images representing movement of a character, accumulates change parts which occur at least one change among the selected images, and define any shape of first areas so that the parts are all covered, to represent a series of movement of the character;

an area dividing device which divides the first area into a plurality of second areas, if the size of the first area is greater than a predetermined size;

a second area defining device which accumulates parts which occur at least one change among the second areas displaying the same part of the first image and defines any shape of third areas so that the parts are all covered;

an area division controlling device which controls to repeat the division of the area dividing device and defining of the second area defining device until the sizes of the third areas become within a predetermined size or until the number of times of the dividing is a predetermined number; and an image storing device which stores the change parts as the second images in a unit of the resulting size of the third areas.

3. The video game device claimed in claim 2, wherein the any shape is rectangular.

4. A video game device having a frame buffer which includes a first area storing a first image used in a game, and a game image displaying device which displays the first image stored in the first area to a display device, comprising:

a second area which is included in the frame buffer and stores second images used to produce the first image;

a game image producing device which when the first image includes change parts which change according to passage of time, reproduces the first image by using the second images which correspond to the change parts of the first image; and a game image storing device which stores the reproduced first image into the first area, the game image displaying device displays the reproduced first image to the display device, each of the second images is partial image subdivided in a predetermined size, each of the second images is stored in the second area in consideration of a relationship of an orientation between an image to be stored in the second area and the image to be displayed, and the size, the location, and the orientation of each of the second images to be stored into the second area is optimized so that the interval of accessing to a storage medium other than the frame buffer for producing the first game image is extended.

5. The video game device claimed in claim 4, further comprising:

a first area defining device which selects a plurality of images representing movement of a character, accumulates change parts which occur at least one change among the selected images, and define any shape of first areas so that the parts are all covered, to represent a series of movement of the character;

an area dividing device which divides the first area into a plurality of second areas, if the size of the first area is greater than a predetermined size;

a second area defining device which accumulates parts which occur at least one change among the second areas displaying the same part of the first image and defines any shape of third areas so that the parts are all covered;

an area division controlling device which controls to repeat the division of the area dividing device and defining of the second area defining device until the sizes of the third areas become within a predetermined size or until the number of times of the dividing is a predetermined number; and an image storing device which stores the change parts as the second images in a unit of the resulting size of the third areas.

6. The video game device claimed in claim 5, wherein the any shape is rectangular.

7. A method of displaying a first image as a game image, the method comprising the steps of:

dividing a frame buffer into a first area storing the first image and a second area storing second images;

optimizing the size, the location, and the orientation of each of the second images to be stored into the second area so that the interval of accessing to a storage medium other than the frame buffer for producing the first game image is extended;

storing the second images which used to produce the first image and subdivided in a predetermine size as partial images into the second area;

reproducing, when the first image includes change parts which change according to passage of time, the first image by using the second images which correspond to the change parts of the first image;

storing the reproduced first image into the first area; and displaying the stored first image.

* * * * *